US006546190B1

(12) United States Patent
Phillips et al.

(10) Patent No.: US 6,546,190 B1
(45) Date of Patent: *Apr. 8, 2003

(54) SYNCHRONIZATION OF MULTIPLE MEDIA STREAMS

(75) Inventors: Michael E. Phillips, Brookline, MA (US); Patrick O'Connor, Billerica, MA (US); Eric Peters, Carlisle, MA (US)

(73) Assignee: Avid Technology, Inc., Tewksbury, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/064,477

(22) Filed: Apr. 22, 1998

Related U.S. Application Data

(63) Continuation of application No. 08/713,107, filed on Sep. 16, 1996, now Pat. No. 5,745,637, which is a continuation of application No. 08/344,409, filed on Nov. 23, 1994, now Pat. No. 5,557,423, which is a continuation of application No. 08/048,645, filed on Apr. 16, 1993, now abandoned.

(51) Int. Cl.[7] .............................. H04N 5/91; H04N 7/52
(52) U.S. Cl. .............................. 386/65; 386/66; 386/100
(58) Field of Search ................................ 386/46, 1, 12, 386/13, 21, 66, 65, 85, 86, 113, 119, 127, 16, 95, 96, 100; H04N 5/91, 7/52

(56) References Cited

U.S. PATENT DOCUMENTS

| 4,586,093 A | 4/1986 | Fukuju et al. |
| 4,587,572 A | 5/1986 | DiGiulio ..................... 386/95 |
| 4,794,465 A | 12/1988 | Van Luyt et al. ........... 386/100 |
| 4,819,087 A | 4/1989 | Takeuchi et al. ........... 360/14.3 |
| 4,914,527 A | 4/1990 | Asai et al. .................. 360/10.3 |
| 4,961,116 A | 10/1990 | Kanamaru et al. .......... 358/343 |
| 5,012,352 A | 4/1991 | Yoshimura et al. ......... 358/343 |
| 5,036,409 A | 7/1991 | Kaaden et al. ................ 360/51 |
| 5,045,940 A | 9/1991 | Peters et al. ................ 358/143 |
| 5,111,409 A | 5/1992 | Gasper et al. .............. 395/152 |
| 5,420,801 A | 5/1995 | Dockter et al. |
| 5,557,423 A | 9/1996 | Phillips et al. ................ 360/13 |
| 5,594,660 A | 1/1997 | Sung et al. ............. 364/514 R |
| 5,661,665 A | 8/1997 | Glass et al. |
| 5,719,786 A * | 2/1998 | Nelson et al. |
| 5,724,605 A | 3/1998 | Wissner |
| 5,745,637 A | 4/1998 | Phillips et al. |
| 5,752,029 A | 5/1998 | Wissner |
| 5,754,851 A | 5/1998 | Wissner |

FOREIGN PATENT DOCUMENTS

| EP | 0 176 324 A1 | 4/1986 |
| FR | 2 594 238 A1 | 8/1987 |
| FR | 2 622 729 A1 | 5/1989 |
| GB | 2 187 324 A | 9/1987 |
| JP | 3-214487 | 9/1991 |

OTHER PUBLICATIONS

Andrew W. Davis, et al. "The MAC Goes to the Movies," BYTE, Under the Hood, vol. 18, No. 2, p. 225–228 and 230, Feb. 1993.

Lindelien, J. Time Logic TLC Telecine Editing System Users' Manual and Tutorial, 1985.

* cited by examiner

*Primary Examiner*—Robert Chevalier
(74) *Attorney, Agent, or Firm*—Peter J. Gordon

(57) ABSTRACT

A method of synchronizing digitized audio information and digitized picture information establishes a reference time base based on timecodes included with the audio and picture information. The reference time base may be used to synchronize output between a digitized source and one which may be digitized or undigitized.

30 Claims, 4 Drawing Sheets

SYNCHRONIZATION OF MULTIPLE MEDIA STREAMS

This application is a continuation of application Ser. No. 08/713,107, filed Sep. 16, 1996 and U.S. Pat. No. 5,745,637 entitled SYNCHRONIZATION OF DIGITAL VIDEO WITH DIGITAL AUDIO, which is a continuation of application Ser. No. 08/344,409 filed Nov. 23, 1994, now U.S. Pat. No. 5,557,423, issued Sep. 17, 1996, which is a continuation of application Ser. No. 08/048,645, filed Apr. 16, 1993, abandoned.

BACKGROUND

1. Field of the Invention

The present invention relates generally to fields of motion picture, television and other multi-media production. More particularly, the invention relates to methods for synchronizing the media comprising a motion picture, television or other multi media production so as to facilitate viewing and editing.

2. Prior Art

Synchronization of multiple media sources is a problem which has plagued the motion picture production industry since the days of the early talkie movies. The techniques by which images are recorded on movie film and the techniques by which sound is recorded on a suitable sound recording medium naturally differ. Therefore, it has been common, since those early days, for two independent pieces of equipment to be used to record image and sound.

In the early days, images were invariably recorded as a sequence of frames on a continuous strip of photographic film. In contrast, sound was recorded as a microscopic wavy groove in either a wax cylinder or a wax disk. Some audio was recorded on the set, but much audio was recorded while observing a screening of the film.

Synchronization of a projected picture with corresponding audio was quite crude. Picture and audio would be started at a reference point established at the program. The speed of one or the other would be manually adjusted when loss of synchronization was observed. However, such techniques provide very poor synchronization, are unsuitable for synchronizing long programs and are unsuitable for synchronizing multiple tracks of audio with picture.

In modern studios, picture may be recorded on film or video tape, in a variety of formats. Audio is likely to be recorded on magnetic recording tape, also in a variety of formats. Whenever multiple tracks of source material are used to create a final production or composition, synchronization of one or more pictures with one or more tracks of audio may be required.

The use of a customary slate at the beginning of each take of a scene helps facilitate synchronization of audio recorded on the set with picture recorded on the set. The slate produces a sharp and distinct sound on the audio recording, simultaneous with an identifiable visual event, such as a bar hitting the top of the board. Additionally, during recording, the camera and the audio recording equipment may be mechanically or electrically synchronized, so that corresponding lengths of film and audio media are used. Consequently, to synchronize these source media for editing or viewing requires only that the sound of the slate in the audio track be aligned with the image of the bar hitting the top of the board. Then the two media may be mechanically or electrically locked together for playback or editing.

For greater flexibility, including the use of multiple tracks recorded either on the set or off the set, timecodes have been developed for aiding in the establishment and maintenance of synchronization in the circumstances such as described above. One type of commonly used timecode is that developed by the Society for Motion Picture and Television Engineers (SMPTE), which may be imprinted in an unused margin of the film or audio media during filming so as to indicate an absolute time reference for each frame of film. The imprinting of the SMPTE timecodes may be human readable, e.g., as numbers in the margin of the film, or may be machine readable, e.g. as bar codes in the margin of the film. Another time reference used on film media is the Eastman Kodak KEYKODE number. Among other things, the KEYKODE number acts as a roll and frame counter, by which any frame of a production may be absolutely identified. It is also recorded in the film margin, but KEYKODES are recorded on film stock at the time of manufacture.

Synchronization during playback may be achieved as follows. First, all the media are aligned manually to a starting point. During playback, timecodes are read off all of the media to be synchronized. The playback speeds of the media are then adjusted so as to cause the timecodes read off the media to coincide throughout the playback. Such systems employ standard feedback techniques to cause the playback speeds of all the media but one to follow the playback speed of the one.

However, the techniques discussed above are inadequate for modern electronic production and editing. As discussed above, current techniques still require physically aligning and synchronizing source media each time a source is to be played or edited. As noted above, this procedure requires manual alignment. It is therefore slow, labor-intensive and prone to error. Furthermore, at stages of production before a final editing sequence has been created, it is difficult to synchronize multi-track audio with cut film.

Systems are also available which can synchronously display digitized audio and video data. One such system is disclosed in Peters et al., U.S. Pat. No. 5,045,940. However, such systems assume synchronization between sources has previously been established. Another such system is commonly known as a lock box. A lock box performs crude synchronization between video and film. However, lock boxes do not accurately synchronize frame by frame, because they depend upon the frame rate of the source media, which differs between video and film.

Therefore, it is a general aim of the present invention to provide a method for synchronizing picture and audio in modern production and post production facilities. More generally stated, it is an aim of the present invention to provide a method of synchronizing a multi-media presentation at all stages of production and post-production.

SUMMARY OF THE INVENTION

In accordance with one aspect of the present invention, there is provided a method for synchronizing a stream of digitized picture data with a stream of digitized audio data. The stream of digitized picture data includes a stream of picture timecodes and the stream of audio data includes a stream of audio timecodes. The method includes steps of: establishing a referenced time base synchronous with one of the stream of picture time codes and the stream audio timecodes; associating another of the stream of picture time codes and the stream of audio timecodes with the reference time base; and, storing as a track group synchronous over a range of time for which the picture data and the audio data coincide, the digitized stream of picture data including the picture timecodes, the digitizes stream of audio data including the audio timecodes and the referenced timebase.

According to another aspect of the present invention, the method may include steps of digitizing the stream of picture data, digitizing the stream of audio data, decoding the stream of picture timecodes and decoding the stream of audio timecodes.

In accordance with another aspect of the present invention, there is provided apparatus for synchronously displaying film dailies and corresponding audio. Such apparatus may include a film projector, means attached to the film projector for producing a stream of picture time codes, means for storing digitized audio data having a referenced time base, and means responsive to the stream of picture timecodes for reproducing the audio data synchronous with the picture timecodes.

In accordance with yet another aspect of the present invention, there is provided a negative cutter apparatus. The negative cutter may include a sync block having a means for determining a starting frame number, a shaft and coder for giving a continuous indication of the position of the media and a digital playback system for comparing current media position with cuts indicated on a digital workprint.

BRIEF DESCRIPTION OF THE DRAWING

In the drawing, wherein like reference numerals indicate like elements.

DETAILED DESCRIPTION

Figure 1:
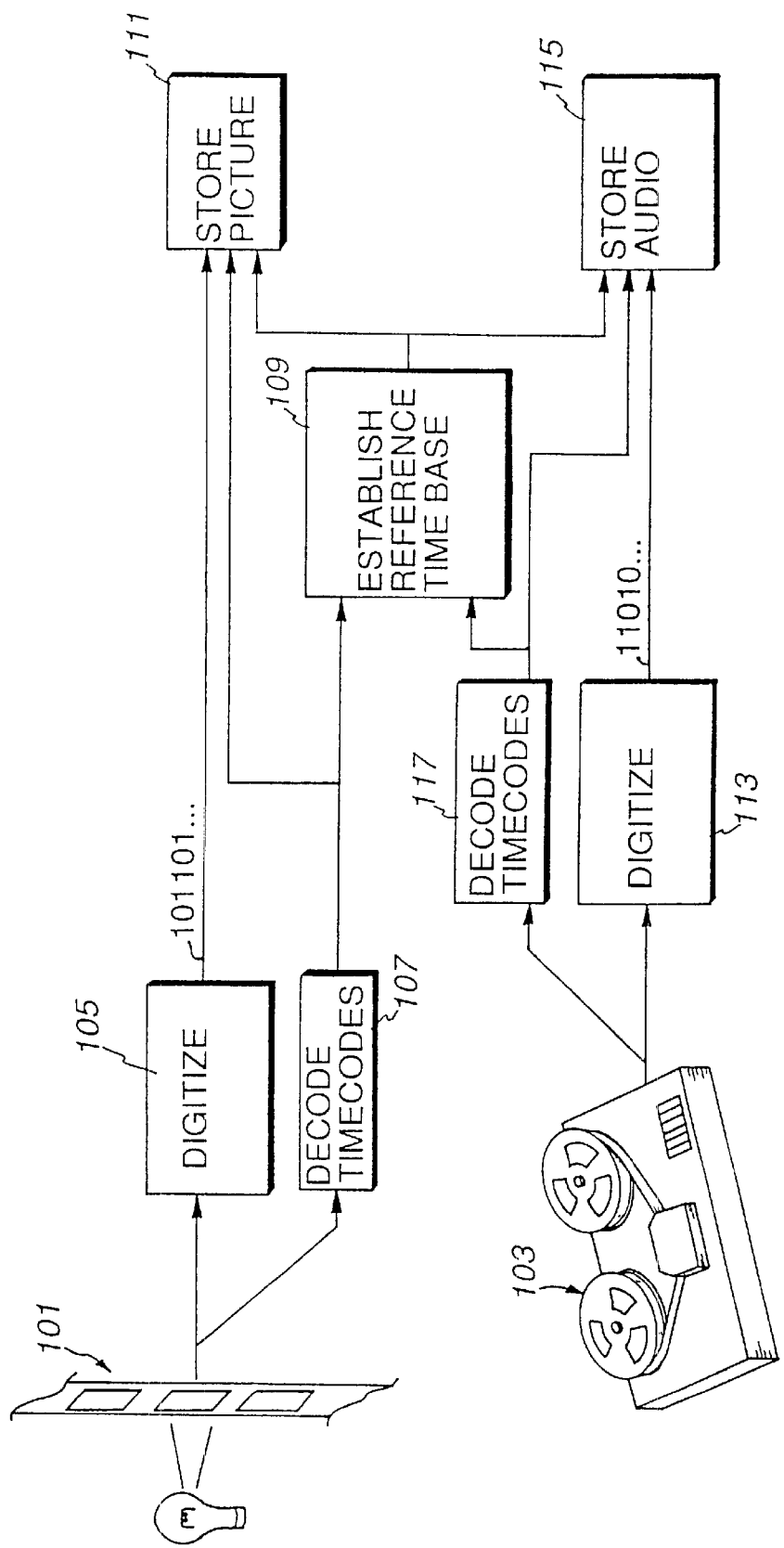
FIG. 1 is a block diagram illustrating digitization of multiple media sources and establishment of a reference timebase for the digitized sources.

The invention will be better understood by reading the following description of embodiments of the invention in conjunction with the drawing.

The present invention seeks to establish synchronization between multiple media sources which are being digitized for further production work. One context in which this may be desirable is that described in pending U.S. patent application Ser. No. 07/920,260, filed Jul. 27, 1992, of Michael Wissner for A METHOD AND APPARATUS FOR REPRESENTING AND EDITING MULTI-MEDIA COMPOSITIONS, incorporated herein by reference. Of particular interest is the description of the data structures contained therein.

Figure 2:
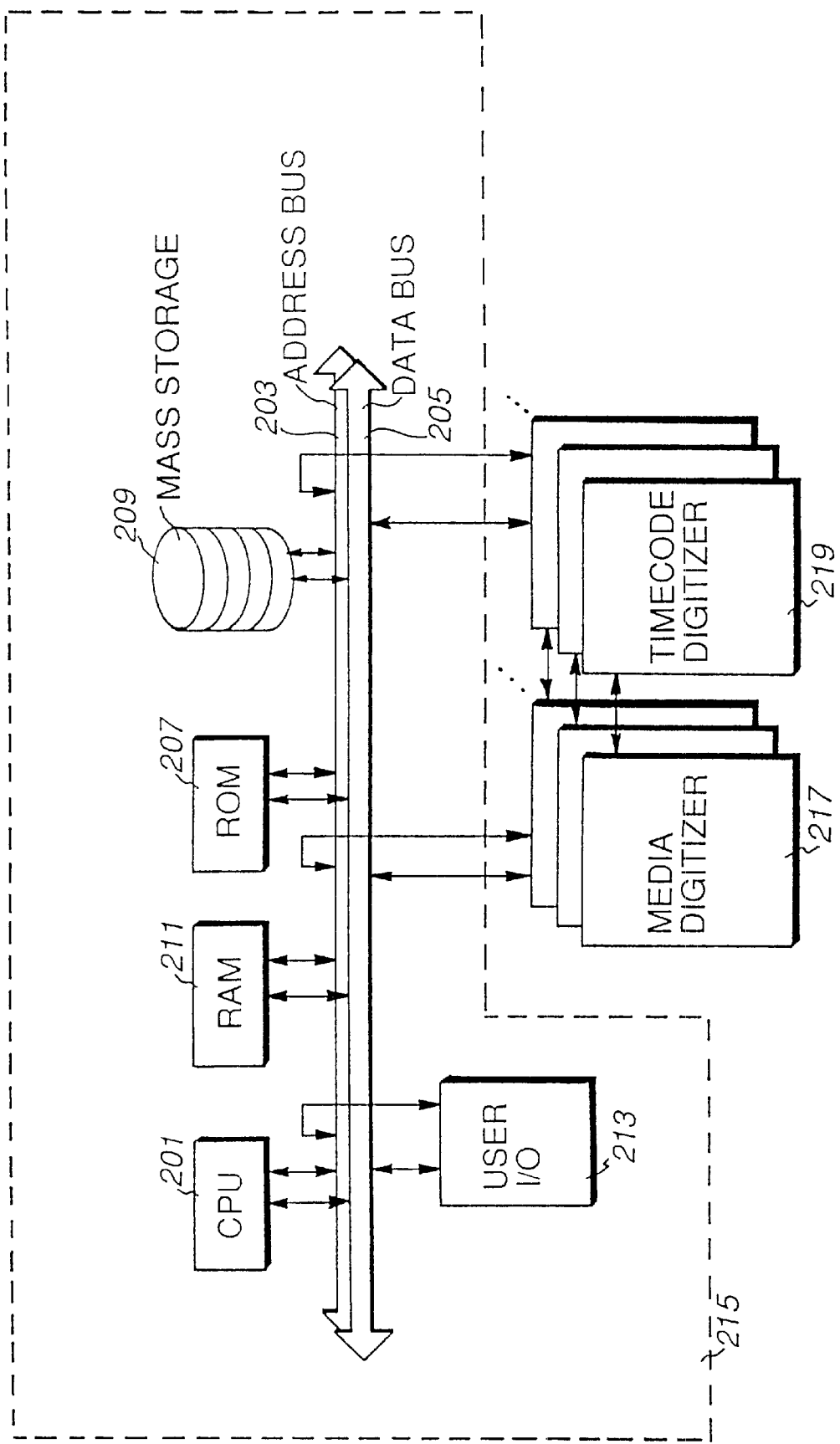
FIG. 2 is a block diagram illustrating the elements of a system suitable for accomplishing the digitization and synchronization of FIG. 1.

A method of achieving synchronization between multiple sources, in accordance with one aspect of the present invention is now described in connection with FIG. 1. Apparatus suitable for practicing this method will be described below in connection with FIG. 2.

This aspect of the present invention makes use of timecodes and timecode readers known in the art and manufactured by AATON and ARRIFLEX under their respective trademarks. Source material, such as film 101 and audio tape 103 may recorded so as to include timecodes according to one of the common systems noted above. The timecodes are recorded periodically on the medium, so as to establish an exact time relationship between each element of the medium and some absolute reference time. For example, each frame of a film 101 has a timecode associated therewith and printed on the edge of the film adjacent to the frame. The recorded timecode represents the absolute time at which that frame was recorded. During the recording of audio tape 103, timecodes are incorporated which correspond to the timecodes representing the frames of film 101. Thus when audio 103 is recorded at the same time as film 101 is shot, each time a timecode is recorded on film 101 the same timecode is recorded on audio tape 103. However, the proper relationship may be established even when audio is recorded separately from film. In that case, the absolute time indicated by the recorded timecodes on audio tape 103 may differ from those of film 101. Furthermore, if different frame rates were used for picture and audio, then the time between timecodes recorded on audio tape 103 will differ from the time between the timecodes recorded on film 101. However, since timecodes represent absolute time, it is still possible to identify any point on audio tape 103 as corresponding with a frame on film 101 by use of the timecodes.

In a subsequent processing step, both picture and audio may be digitized for electronic storage. These operations may occur independently of each other, in series or simultaneously. Since the operations are independent, they will be described separately, assuming for the purposes of this example that film 101 is digitized first. However, there is no loss of generality and the same operations may be performed in any sequence noted above.

Film 101 is digitized 105 simultaneous with reading and decoding of timecodes 107, which have been previously recorded in the margin of the film, for example. Decoded timecodes from film 101 are then used to establish a reference timebase 109. The reference timebase is used to accomplish synchronization as discussed below.

Since the timecodes recorded on film 101 represent absolute time at which each frame was recorded, there will ordinarily be time gaps between the last timecode of one take and the first timecode of a subsequent take. The source material is divided into clips at each such discontinuity in the timecode. The reference timebase for each clip is essentially periodic timing information stored with the digitized clip and beginning at time 0 at the beginning of the clip. The information ultimately stored with each clip includes the digitized source, the decoded timecodes and the reference time base. The reference time base acts essentially as a frame or footage counter for locating a position within the clip. In the case of film 101, these three types of information are stored as picture information 111.

By a similar process, audio tape 103 is digitized 113 and stored 115. Like film 101, audio tape 103 also includes timecodes recorded therein. The timecodes are decoded 117 and used to establish a reference timebase 109 to be stored along with the digitized audio information 115.

The beginning of clip of picture information and the clip of audio information is identified by a common starting timecode, thus establishing time "0" of the reference time base. If film 101 and audio tape 103 were originally recorded simultaneously, corresponding stored pictures and stored audio are now synchronized by virtue of having common reference timebases.

Sometimes the picture timecodes and audio timecodes recorded with each source to be synchornized are not common. For example, if one timecode generator was used for picture, and another timecode generator whose clock was set differently was used for audio, then the recorded timecodes are not in common. If multiple sources do not have common timecodes, then an offset may be applied to bring them into alignment, if desired. That is, time "O" of the reference timebase for picture may be one timecode, while that for audio may be a different timecode. However, once the timecodes for time "O" of the reference time base have been established, the common reference time base maintains synchronization between the digitized sources.

A system suitable for performing synchronization as described above is now described in connection with FIG. 2. This system is given by way of example only, and the principles of the present invention may be embodied in other hardware implementations.

The embodiment now described is based on modern computer technology. For example, some elements of this system may be incorporated within a commonly available personal computer system.

The system is controlled by a central processing unit (CPU) 201. CPU 201 communicates with other elements of the system via address bus 203 and data bus 205 in a conventional manner. Information including software program steps and other data which facilitate performance of the control function by CPU 201 may be stored in read only memory (ROM) 207. The software program steps and data stored in ROM 207 are not readily alterable. Additional program steps and data may be stored in some form of mass storage device 209, for example a hard disk drive or tape drive. In order to use program steps or data stored in ROM 207 or mass storage device 209, CPU 201 may transfer such data to a random access memory (RAM) 211. Finally the system may be provided with one or more user I/O devices 213. These devices may include, but are not limited to keyboards, pointing devices, monitors and printers. Taken together, the above described elements of the system may constitute a personal computer system 215 including one or more add on user I/O devices 213.

To a system as described above, one or more media digitizers 217 and corresponding timecode decoders 219 are added. A digitizer appropriate to each type of media to be used with the system is required, as well as a timecode decoder appropriate for use with any included media digitizer and suitable for decoding any expected timecode format. Digitizers 217 which may be used in this embodiment include video cards manufactured by TRUEVISION and DIGIDESIGN. The Avid Film Composer employs such video cards, specially modified to provide additional functionality required by that product. Timecode decoders such as those manufactured by AATON or ARRIFLEX and commonly in use are suitable for application as timecode decoders 219.

Figure 3:
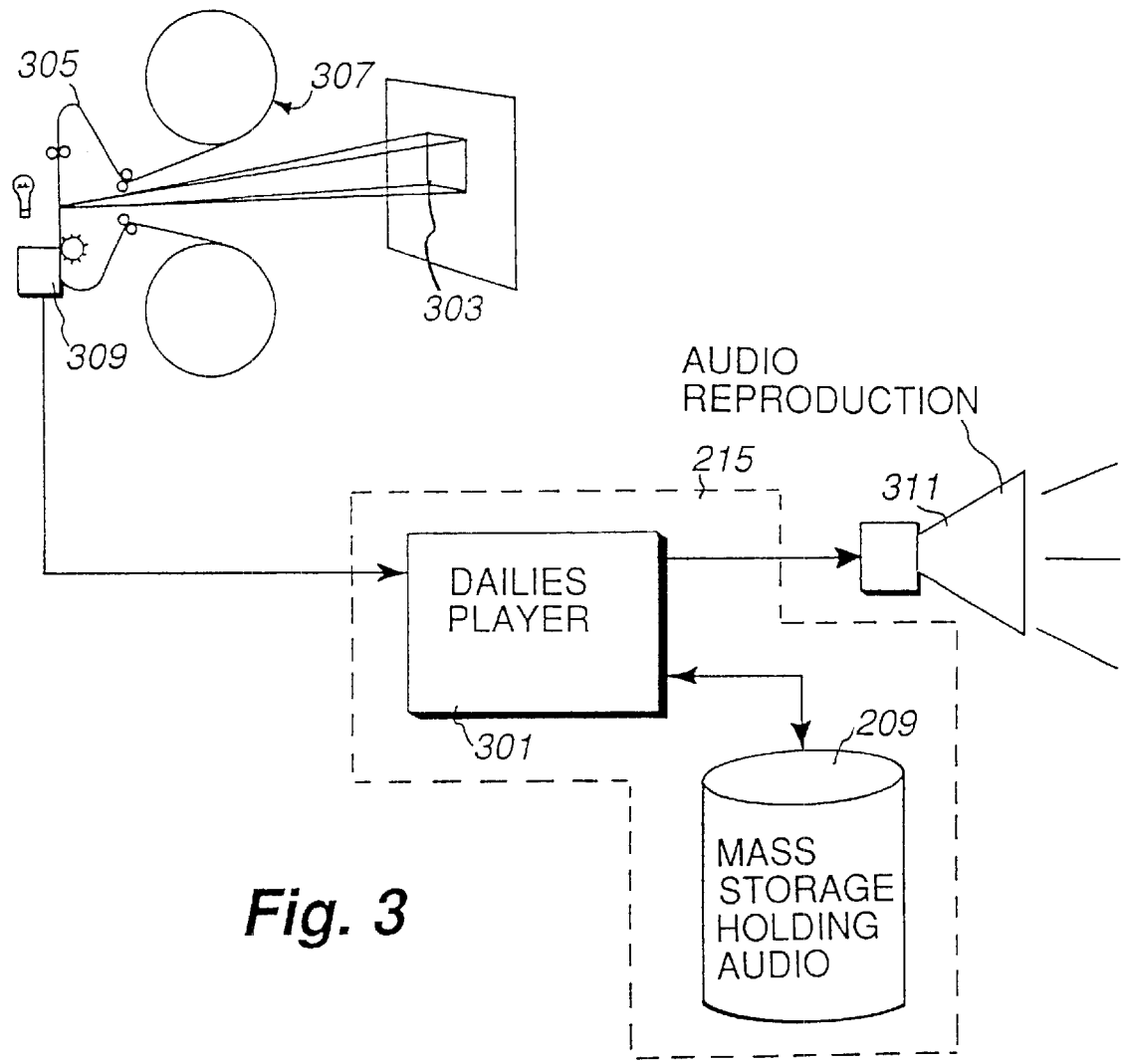
FIG. 3 is a block diagram illustrating one system for synchronous playback of digitized source media in conjunction with the display non-digitized source media.

Once synchronization of digitized sources has been achieved as described above in connection with FIG. 1, certain novel playback techniques may be used in accordance with another aspect of the present invention. A first such novel technique is now described in connection with FIG. 3.

When a director desires to periodically check the quality of work then being filmed, he may rely on viewing those rolls of film shot in the previous day, commonly known as "dailies." Dailies are quickly processed and do not include integral audio information. Thus, the audio corresponding to a roll of dailies must be synchronized with the roll, while it is being viewed, so as to provide a useful display of the day's work.

In accordance with this aspect of the present invention, a personal computer 215, such as described above in connection with FIG. 2 is used. Mass storage device 209 holds the digitized audio information corresponding to the dailies to be shown, including the original timecodes and the information representing the reference timebase. The control function represented by certain computer program steps being executed by CPU (FIG. 2, 201) give computer 215 the function of dailies synchronizer 301. When the director views dailies, he views an image 303 projected using raw, uncut film 305. As noted above, film 305 does not include the audio tracks, which have been recorded separately. It is this audio which is held in mass storage device 209. The projector 307 by which film 305 is shown may be fitted with a timecode reader 309.

Timecodes read off film 305 are decoded and fed into dailies player 301. The decoded timecodes are then converted into the reference timebase and used to retrieve corresponding audio information from mass storage device 209. Such audio information may then be reproduced by audio reproduction equipment 311, synchronous with the image 303 projected by projector 307. Thus, the audio and picture synchronization which previously had to be performed by hand prior to projecting film 305 may be accomplished automatically.

In an alternate embodiment, timecode reader 309 may be replaced with a bi-phase generator and a bi-phase-to-timecode converter, such as that manufactured by LYNX. This alternate arrangement produces timecodes synchronous with the running projector and beginning with any arbitrary timecode an operator may set.

Figure 4:
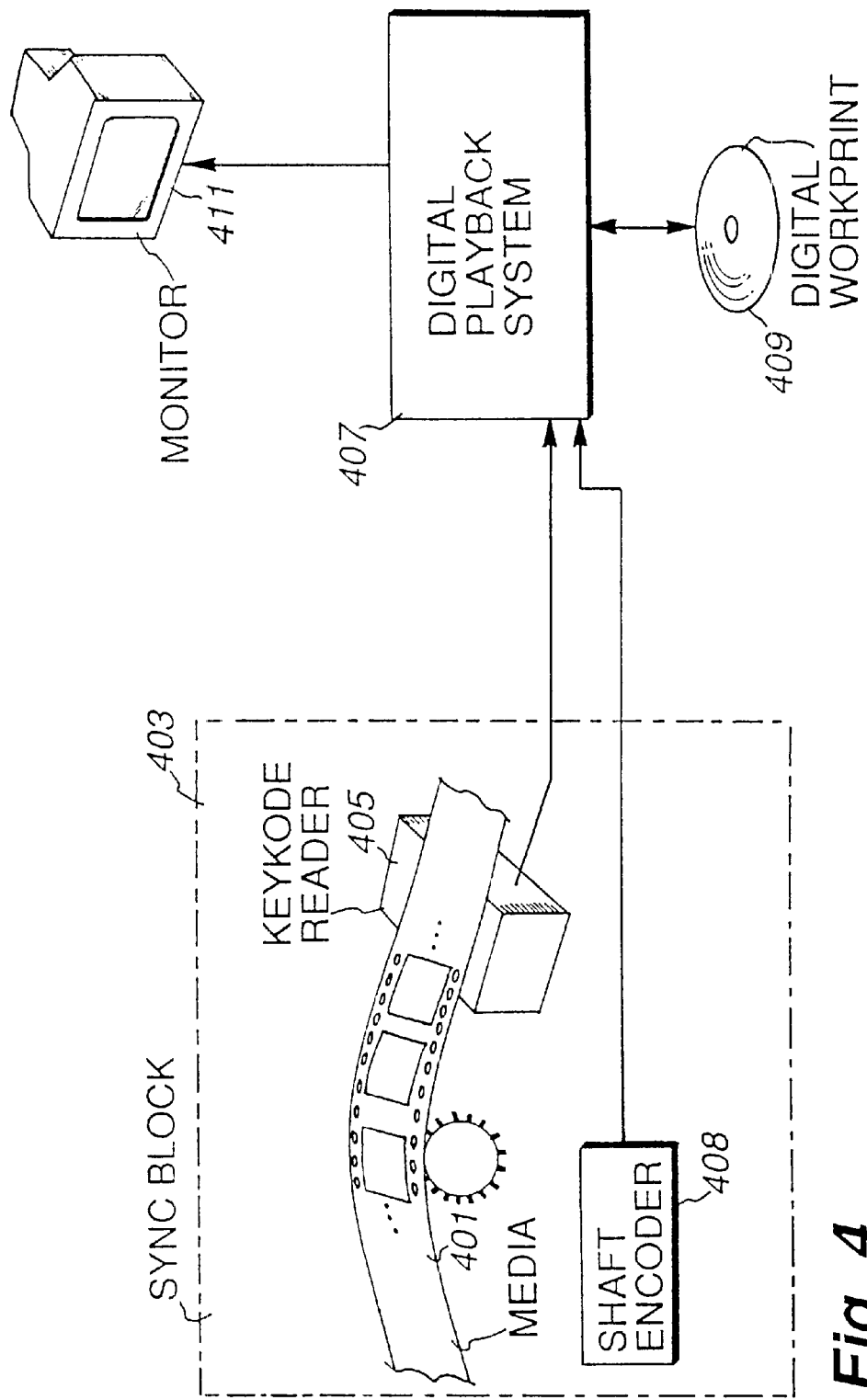
FIG. 4 is a block diagram of a negative cutter system employing the synchronization techniques of the present invention.

Another novel aspect of synchronization in accordance with the present invention is illustrated in connection with a negative cutter, as shown in FIG. 4.

Media 401, such as film or audio tape is threaded into sync block 403. Sync block 403 include a KEYKODE reader 405. KEYKODE readers are commonly available from such manufacturers as EVERTZ, CINEMA PRODUCTS, AATON, ARRIFLEX and SKOTEL. KEYKODES are a reference code indicating frame numbers on film media 401. However, KEYKODES are recorded on the film 401 only about once each ½ foot. Given an initial KEYKODE for a particular piece of film 401, which is currently threaded into sync block 403, a digital playback system 407 may be made to receive a continuous indication of the position of media 401 within sync block 403 by means of shaft encoder 408.

Another input to digital playback system 407 is a digital work print 409. Digital workprint 409 is preferably an optical disk containing the result of producing a composition using the method and apparatus described in the above-referenced patent application Ser. No. 07/920,260 The data contained on the digital workprint 409 includes the digitized picture and audio information, the original time codes associated with each picture clip and audio clip, the reference time base information and various sequencing information as described in the above-referenced patent application with respect to a complete composition. By using the information described, digital playback system 407 can be used to indicate on a monitor 411, or by other means such as sounding a beep tone, when the media 401 threaded in sync block 403 is located at a position where a cut is to be made. This is possible because the start and end of each clip on digital workprint 409 are clearly indicated by the timecodes originally associated with that clip, and those timecodes may be readily converted to KEYKODES, knowing the time between frames and the first KEYKODE on a particular piece of media. Thus, the editor of a composition need not produce a traditional paper cutlist, which may be prone to transcription errors. Rather, the digital work print serves the function of informing the negative cutter the precise location of cuts to be made.

The present invention has now been described in connection with specific embodiments thereof. The foregoing description should suggest to those skilled in the art modifications and extensions of those embodiments, which are contemplated as falling within the scope of the present invention. The present invention is not intended to be limited by the foregoing description, but is limited only by the scope of the appended claims.

What is claimed is:

1. A method for synchronizing multiple streams of digital media data, including a first stream of digital media data including a first stream of timecodes and a second stream of digital media data including a second stream of timecodes, the first stream of timecodes having a first time resolution and the second stream of timecodes having a second time resolution, the method comprising:

determining a first relationship between a reference time base, beginning at a reference time zero and including periodic timing information, and one of the first and second streams of timecodes, the reference time base having a third time resolution;

determining a second relationship between another of the first and second streams of timecodes with the reference time base; and storing a representation of the first and second streams of digital media data as concurrent synchronized streams using the reference time base according to the determined first and second relationships.

2. The method of claim 1, wherein determining the first relationship further comprises:

setting reference time zero to be coincident with a first timecode of one of the first stream of timecodes and the second stream of timecodes.

3. The method of claim 1, wherein over a range of time of coincidence of the first stream of digital media data and the second stream of digital media data, the first stream of timecodes differ from the second stream of timecodes and wherein determining the first relationship further comprises:

setting the reference time zero to be coincident with a first timecode of the second stream of timecodes.

4. An apparatus for synchronizing digital audio data including audio timecodes with a film source, comprising:

means for receiving time information from the film source representing a stream of picture timecodes;

means for specifying a reference time base beginning at a reference time zero and including periodic timing information synchronous with the picture timecodes;

means for creating an association of the reference time zero with a first audio timecode of the audio timecodes; and means for storing a representation of the film source and the audio as concurrent syncrhonized streams according to the association created between the reference time base and the audio timecodes.

5. Apparatus for synchronizing multiple streams of digital media data including a first stream of digital media data including a first stream of timecodes and a second stream of digital media data including a second stream of timecodes, the first stream of timecodes having a first time resolution and the second stream of timecodes having a second time resolution, the apparatus comprising:

means for determining a first relationship between a reference time base, beginning at a reference time zero and including periodic timing information, and one of the first and second streams of timecodes, the reference time base having a third time resolution;

means for determining a second relationship between another of the first and second stream of timecodes with the reference time base; and means for storing a representation of the first and second streams of digital media data as concurrent synchronized streams using the reference time base according to the determined first and second relationships.

6. The apparatus of claim 5, wherein the means for determining the first relationship further comprises:

means for establishing reference time zero as coincident with a first timecode of one of the first stream of timecodes and the second stream of timecodes.

7. The apparatus of claim 5, wherein over a range of time of coincidence of the first stream of digital media data and the second stream of digital media data, the first stream of timecodes differ from the second stream of timecodes and wherein the means for determining the first relationship further comprises:

means for establishing the reference time zero as coincident with a first timecode of the second stream of timecodes.

8. A method for synchronizing digital audio data including audio timecodes with a film source, comprising:

receiving time information from the film source representing a stream of picture timecodes;

specifying a reference time base beginning at a reference time zero and including periodic timing information synchronous with the picture timecodes;

creating an association of the reference time zero with a first audio timecode of the audio timecodes; and storing a representation of the film source and the audio as concurrent syncrhonized streams according to the association created between the reference time base and the audio timecodes.

9. A method for automatically synchronizing a plurality of independently captured streams of digital media data to each other, wherein each stream has corresponding time codes, comprising:

determining a first relationship between a start time code of a first stream of the plurality of streams of digital media data and a reference time zero of a reference time base;

determining a second relationship between a start time code of a second stream of the plurality of streams of digital media data and the reference time zero of a reference time base; and creating a data structure describing the first and second streams of digital media data as a collection of concurrent components having a common start time of the reference time zero, in accordance with the first relationship and the second relationship, whereby the first and second streams of digital media data are synchronized with each other.

10. The method of claim 9 wherein a first component in the data structure describes the first stream and references the start time code of the first stream and a second component in the data structure describes the second stream and references the start time code of the second stream.

11. The method of claim 9, wherein the first stream and the second stream have different frame rates.

12. The method of claim 11, wherein the time codes of the first stream and the time codes of the second stream are coincident in absolute time.

13. The method of claim 11, wherein the time codes of the first stream and the time codes of the second stream are not coincident in absolute time, whereby the start time code for the first stream is different from the start time code of the second stream.

14. The method of claim 9, wherein the first stream and the second stream have the same frame rate.

15. The method of claim 14, wherein the time codes of the first stream and the time codes of the second stream are coincident in absolute time.

16. The method of claim 14, wherein the time codes of the first stream and the time codes of the second stream are not coincident in absolute time, whereby the start time code for the first stream is different from the start time code of the second stream.

17. The method of claim 9, wherein the time codes of the first stream and the time codes of the second stream are coincident in absolute time.

18. The method of claim 9, wherein the time codes of the first stream and the time codes of the second stream are not coincident in absolute time, whereby the start time code for the first stream is different from the start time code of the second stream.

19. The method of claim 9, wherein the first stream is video and the second stream is audio.

20. An apparatus for automatically synchronizing a plurality of independently captured streams of digital media data to each other, wherein each stream has corresponding time codes, comprising:

means for determining a first relationship between a start time code of a first stream of the plurality of streams of digital media data and a reference time zero of a reference time base;

means for determining a second relationship between a start time code of a second stream of the plurality of streams of digital media data and the reference time zero of a reference time base; and means for storing a data structure describing the first and second streams of digital media data as a collection of concurrent components having a common start time of the reference time zero, in accordance with the first relationship and the second relationship, whereby the first and second streams of digital media data are synchronized with each other.

21. The apparatus of claim 20, wherein a first component in the data structure describes the first stream and references the start time code of the first stream and a second component in the data structure describes the second stream and references the start time code of the second stream.

22. The apparatus of claim 20, wherein the first stream and the second stream have different frame rates.

23. The apparatus of claim 22, wherein the time codes of the first stream and the time codes of the second stream are coincident in absolute time.

24. The apparatus of claim 22, wherein the time codes of the first stream and the time codes of the second stream are not coincident in absolute time, whereby the start time code for the first stream is different from the start time code of the second stream.

25. The apparatus of claim 20, wherein the first stream and the second stream have the same frame rate.

26. The apparatus of claim 25, wherein the time codes of the first stream and the time codes of the second stream are coincident in absolute time.

27. The apparatus of claim 25, wherein the time codes of the first stream and the time codes of the second stream are not coincident in absolute time, whereby the start time code for the first stream is different from the start time code of the second stream.

28. The apparatus of claim 20, wherein the time codes of the first stream and the time codes of the second stream are coincident in absolute time.

29. The apparatus of claim 20, wherein the time codes of the first stream and the time codes of the second stream are not coincident in absolute time, whereby the start time code for the first stream is different from the start time code of the second stream.

30. The apparatus of claim 20, wherein the first stream is video and the second stream is audio.

* * * * *